(12) United States Patent
Schoon et al.

(10) Patent No.: US 12,709,321 B2
(45) Date of Patent: Aug. 18, 2026

(54) ELECTRIC POWER STEERING GEAR WITH AN ANTI-ROTATE FEATURE

(71) Applicant: ZF CV Systems Global GmbH, Bern (CH)

(72) Inventors: Benjamin Schoon, Lafayette, IN (US); Caleb Crum, Rossville, IN (US); Zach Robert Volmering, Noblesville, IN (US); Kevin Boyle, Hermitage, TN (US)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 361 days.

(21) Appl. No.: 18/599,264

(22) Filed: Mar. 8, 2024

(65) Prior Publication Data

US 2025/0282416 A1 Sep. 11, 2025

(51) Int. Cl.
*B62D 5/04* (2006.01)
*F16C 33/12* (2006.01)

(52) U.S. Cl.
CPC .......... *B62D 5/0448* (2013.01); *F16C 33/122* (2013.01); *F16C 2204/12* (2013.01); *F16C 2204/60* (2013.01); *F16C 2326/01* (2013.01)

(58) Field of Classification Search
CPC ...... B62D 5/0448; B62D 5/0409; B62D 3/04; F16C 33/122; F16C 2204/12; F16C 2204/60; F16C 2326/01; F16C 17/10; F16C 2326/24; F16C 27/02; F16C 17/107; F16C 19/184; F16C 35/063; F16C 39/02; F16C 2226/16; F16C 23/086; F16C 2326/05; F16C 29/02; F16C 35/02; F16C 2208/36; F16C 23/045; F16C 2361/31; F16C 25/02; B60G 2204/418
See application file for complete search history.

(56) References Cited

U.S. PATENT DOCUMENTS

2023/0313869 A1* 10/2023 Case Myers ......... B62D 5/0445 180/444

FOREIGN PATENT DOCUMENTS

DE 4138884 A1 * 6/1993 ........... B62D 5/0448
EP 3647156 A1 * 5/2020 ............ F16H 55/28

OTHER PUBLICATIONS

Espace translation of DE 41 38 884 A1 (Year: 1993).*

* cited by examiner

*Primary Examiner* — Vivek D Koppikar
*Assistant Examiner* — Scott Lawrence Strickler
(74) *Attorney, Agent, or Firm* — LEYDIG, VOIT & MAYER, LTD.

(57) ABSTRACT

A steering assembly includes a housing. An interior wall of a cylindrical portion of the housing defines a groove that extends in an axial direction and having inwardly tapered walls. A ball screw disposed in the housing defines a hole in a radial direction. An anti-rotational pin having a tapered end is disposed in the hole, the tapered end corresponding to the inwardly tapered walls. A spring disposed in the hole biases the anti-rotational pin so that the tapered end of the anti-rotational pin engages the groove and restricts rotation of the ball screw. A support bushing disposed between the ball screw and the housing is fixedly coupled to the ball screw and defines a through hole between the groove and the hole of the ball screw, the through hole receives the anti-rotational pin. The support bushing absorbs radial loads exerted on the ball screw and supports the anti-rotational pin.

20 Claims, 12 Drawing Sheets

902
902
900

1002
310
104
1004
106
110
108
614
1000

ELECTRIC POWER STEERING GEAR WITH AN ANTI-ROTATE FEATURE

FIELD

The present disclosure relates to a steering gear for a vehicle with an anti-rotate feature.

BACKGROUND

Commercial vehicles that use Electric Powered Steering (EPS). Electric Powered Steering is implemented using an electric power steering gear. The electric power steering gear utilizes a ball nut to provide a ball screw with linear translation. This linear translation motion of the ball screw turns the tires to steer the path of the vehicle. To keep the ball screw from turning with the ball nut, an anti-rotational feature engages the gear housing to rotationally fix the ball screw relative to the housing. Current anti-rotational methods include a male spline on the ball screw and a female spline fixed to the gear housing. One such example is a pin in a hole through the ball screw that engages in an axial groove in the gear housing, permitting it to slide along the axial groove while prohibiting rotation relative to the gear housing. However, conventional methods do not prevent undesirable free rotational movement (referred to as lash) due to manufacturing tolerances and normal wear due to use.

SUMMARY

Current anti-rotational features permit a small amount of play between a ball screw and housing of a steering mechanism, also known as lash, due to normal wear and tear and manufacturing tolerances.

Embodiments of the present disclosure provide, in a first aspect, an electric powered steering assembly for a commercial vehicle, comprising: a housing including a cylindrical portion extending in an axial direction, an interior wall of the cylindrical portion defining a groove and extending in the axial direction, the groove having at least two inwardly tapered walls; a ball screw disposed in the housing, extending in the axial direction, and defining a hole extending in a radial direction; a ball nut disposed in the housing surrounding the ball screw and configured to rotate relative to the housing; an anti-rotational pin having a tapered end disposed in the hole, the tapered end having at least two tapered surfaces, each corresponding to a respective one of the at least two inwardly tapered walls; a spring disposed in the hole and configured to bias the anti-rotational pin in a radially outward direction towards the groove so that the at least one tapered end of the anti-rotational pin engages the groove and thereby restricts rotation of the ball screw relative to the housing; and a support bushing disposed in the housing between the ball screw and the housing, the support bushing being fixedly coupled to the ball screw and defining a through hole disposed between the groove and the hole of the ball screw, the through hole configured to receive the anti-rotational pin, wherein the support bushing absorbs radial loads exerted on the ball screw by the electric power steering assembly and supports the anti-rotational pin.

According to an implementation of the first aspect, the interior wall of the cylindrical portion defining a second groove and extending in the axial direction, the second groove having at least two inwardly tapered walls; the ball screw disposed in the housing, extending in the axial direction, and defining a second hole extending in the radial direction; a second anti-rotational pin having a tapered end disposed in the second hole, the tapered end having at least two tapered surfaces, each corresponding to a respective one of the at least two inwardly tapered walls of the second groove; and a second spring disposed in the second hole and configured to bias the second anti-rotational pin in a radially outward direction towards the second groove so that the at least one tapered end of the second anti-rotational pin engages the second groove and thereby restricts rotation of the ball screw relative to the housing.

According to an implementation of the first aspect, the at least two tapered walls of the groove inwardly taper at a first angle.

According to an implementation of the first aspect, the at least two tapered surfaces of the tapered end of the anti-rotational pin taper at the first angle to match the taper of the groove.

According to an implementation of the first aspect, the ball nut is configured to rotate over the ball screw and engage threads of the ball screw.

According to an implementation of the first aspect, the rotation of the ball nut over the ball screw results in an axial translation of the ball screw in a right or left direction based on a rotational direction of the ball nut.

According to an implementation of the first aspect, engaging the groove with the anti-rotational pin restricts the rotation of the ball screw relative to the ball nut.

According to an implementation of the first aspect, the support bushing is fixedly coupled to the ball screw using a plurality of bolts distributed evenly across the support bushing.

According to an implementation of the first aspect, the support bushing is composed of a smooth steel or bronze.

According to an implementation of the first aspect, a coating is applied on the support bushing.

According to an implementation of the first aspect, the coating is composed of polytetrafluoroethylene (PTFE).

A second aspect of the present disclosure provides a method of providing a lash-free electric powered steering gear for a commercial vehicle, the method comprising: providing a housing including a cylindrical portion extending in an axial direction, an interior wall of the cylindrical portion defining a groove and extending in the axial direction, the groove having at least two inwardly tapered walls; providing a ball screw disposed in the housing, extending in the axial direction, and defining a hole extending in a radial direction; providing a ball nut disposed in the housing surrounding the ball screw and configured to rotate relative to the housing; providing an anti-rotational pin having a tapered end disposed in the hole, the tapered end having at least two tapered surfaces, each corresponding to a respective one of the at least two inwardly tapered walls; biasing the anti-rotational pin, using a spring disposed in the hole, in a radially outward direction towards the groove so that the at least one tapered end of the anti-rotational pin engages the groove and thereby restricts rotation of the ball screw relative to the housing; providing a support bushing disposed in the housing between the ball screw and the housing, the support bushing being fixedly coupled to the ball screw and defining a through hole disposed between the groove and the hole of the ball screw, wherein the through hole is configured to receive the anti-rotational pin; and absorbing, using the support bushing, radial loads exerted on the ball screw by the electric power steering assembly and supporting the anti-rotational pin.

According to an implementation of the second aspect, the method further comprises providing the interior wall of the cylindrical portion defining a second groove and extending in the axial direction, the second groove having at least two inwardly tapered walls; providing the ball screw disposed in the housing, extending in the axial direction, and defining a second hole extending in the radial direction; providing a second anti-rotational pin having a tapered end disposed in the second hole, the tapered end having at least two tapered surfaces, each corresponding to a respective one of the at least two inwardly tapered walls of the second groove; and providing a second spring disposed in the second hole and configured to bias the second anti-rotational pin in a radially outward direction towards the second groove so that the at least one tapered end of the second anti-rotational pin engages the second groove and thereby restricts rotation of the ball screw relative to the housing.

According to an implementation of the second aspect, the at least two tapered walls of the groove inwardly taper at a first angle, and wherein the at least two tapered surfaces of the tapered end of the anti-rotational pin taper at the first angle to match the taper of the groove.

According to an implementation of the second aspect, the ball nut is configured to rotate over the ball screw and engage threads of the ball screw.

According to an implementation of the second aspect, the rotation of the ball nut over the ball screw results in an axial translation of the ball screw in a right or left direction based on a rotational direction of the ball nut.

According to an implementation of the second aspect, engaging the groove with the anti-rotational pin restricts the rotation of the ball screw relative to the ball nut.

According to an implementation of the second aspect, the support bushing is fixedly coupled to the ball screw using a plurality of bolts distributed evenly across the support bushing.

According to an implementation of the second aspect, the support bushing is composed of a smooth steel or bronze.

According to an implementation of the second aspect, a coating is applied on the support bushing, and wherein the coating is composed of polytetrafluoroethylene (PTFE).

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
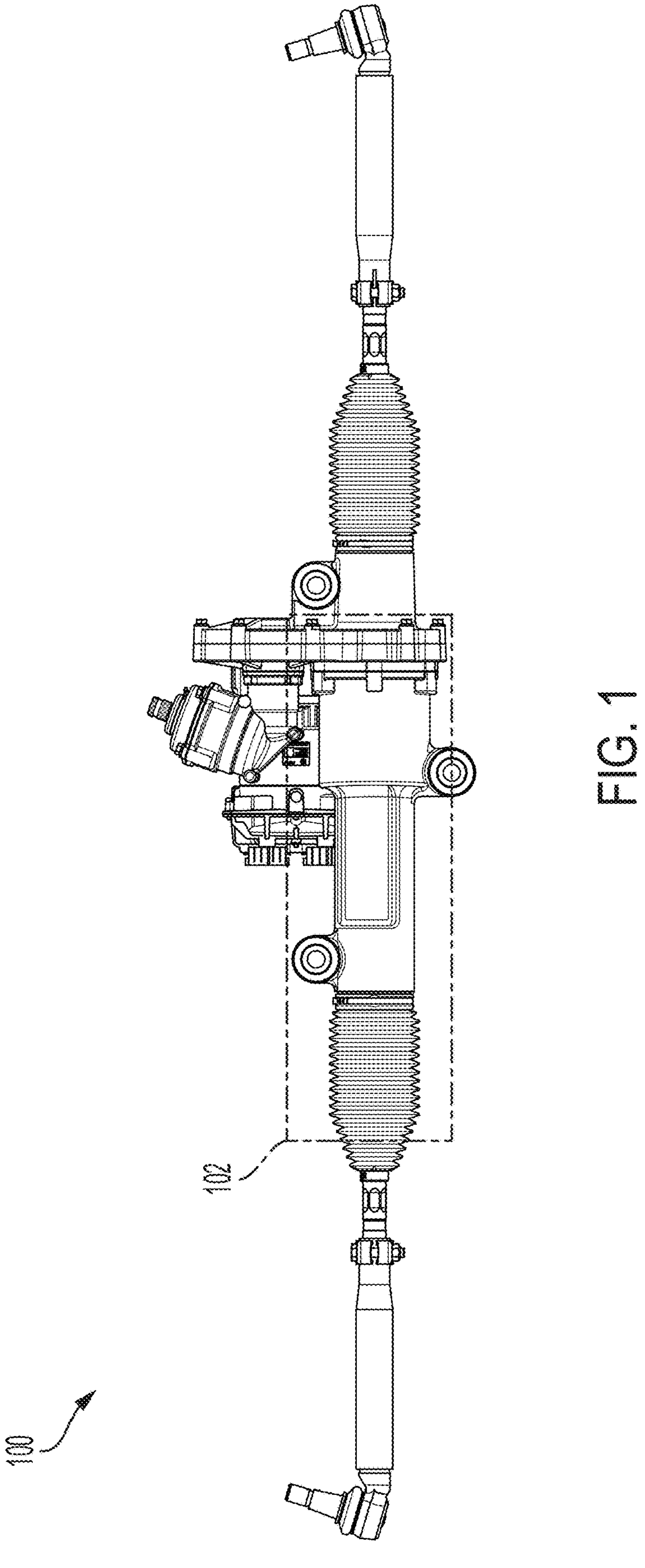
FIG. 1 illustrates an overview of a gear assembly of a vehicle, according to one or more examples of the present disclosure.

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Commercial vehicles use Electric Powered Steering (EPS) gears for steering. EPS gears include a ball screw oriented transversely to the vehicle and disposed within a gear housing and a ball nut surrounding the ball screw in the housing. Upon receiving steering commands from a driver, the EPS gear of the vehicle comprising the ball nut and ball screw is configured transfer the steering command from the driver to the wheels of the vehicle. For example, upon receiving the steering command from a driver, the ball nut is configured to rotate around the ball screw. Due to the threading of the ball screw and ball nut, rotation of the ball nut causes the ball screw to translate in the right or left direction depending on the rotational direction of rotation of the ball nut. The translation of the ball screw causes the wheels of the vehicle to turn, thereby steering the vehicle. In order to facilitate the translation of the ball screw, the ball screw has an anti-rotational feature that prevents the ball screw from rotating relative to the housing. However, due to manufacturing tolerances and normal wear, conventional anti-rotational feature permits a small amount of play between the ball screw and housing, also known as lash.

One possible way to avoid lash in the electric power steering gear is to use anti-rotational pins having tapered ends with the ball screw. In some embodiments, two anti-rotational pins with tapered ends are placed in a common through hole that extends radially through the ball screw so that their tapered ends face in a radially outward direction from the center of the ball screw. The inner cylindrical wall of the housing includes two grooves extending axially that are configured to receive the tapered ends of the two anti-rotational pins. The grooves include tapered groove walls corresponding to the tapered ends of the anti-rotational pins. The angle of tapering in the grooves is same as the angle of tapering on the two anti-rotational pins. A spring is placed between the two anti-rotational pins in the ball screw so as to bias the two anti-rotational pins in the radially outward direction and to hold the anti-rotational pins in contact with the grooves and to ensure a tight fit between pins and the grooves. This arrangement of the anti-rotational pins prevents the ball screw from rotating relative to the housing and eliminates lash, while permitting axial movement of the ball screw relative to the housing. This embodiment is discussed in more detail with respect to FIGS. 1-5.

In another embodiment, any number of anti-rotational pins may be used to avoid lash in the electric powered steering gears. The inner cylindrical wall of the housing may be modified to include the same number of grooves extending in the axial direction, as the number of anti-rotational pins used. In this embodiment, instead of a through hole, the ball screw has a hole for each anti-rotational pin and a respective spring to bias the anti-rotational pin in a radially outward direction towards a corresponding groove. This embodiment is discussed in more detail in FIGS. 6-12.

FIG. 1 illustrates an overview of a gear assembly of a vehicle, according to one or more examples of the present disclosure. The gear assembly 100 depicted in FIG. 1 is responsible for providing the steering functionality to the vehicle. Section 102 of the gear assembly 100 shown in FIG. 1 comprises a ball screw and a ball nut, which is discussed in more detail in FIGS. 2-5.

Figure 2:
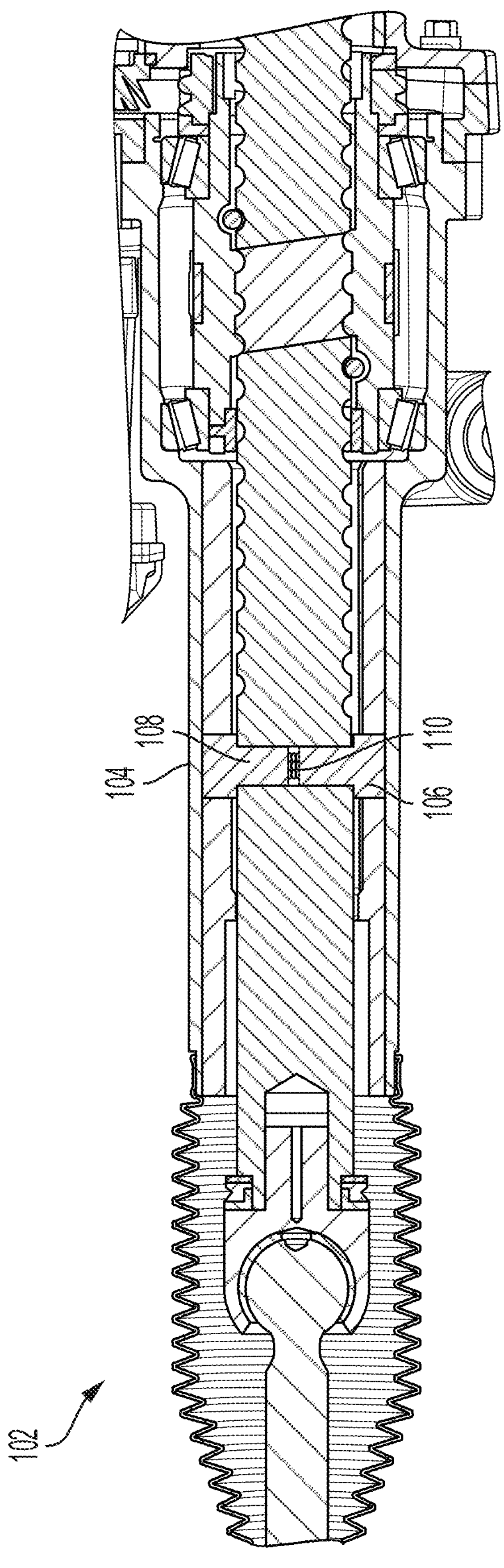
FIG. 2 illustrates a side cross-section view of a portion of the complete gear assembly of the vehicle, according to one or more examples of the present disclosure.

FIG. 2 illustrates a side cross-section view of a portion of the complete gear assembly of the vehicle, according to one or more examples of the present disclosure. Portion 102 of the gear assembly 100 includes a housing 104 of the gear assembly that is cylindrically shaped and extends transversely to the vehicle. A ball screw and ball nut (shown in more detail in FIGS. 3 and 5) are present in the housing 104. The ball nut and the ball screw are configured to convey the steering commands received from a driver to the wheels of the vehicle to steer the vehicle. In order to hold the ball screw grounded to the housing 104, the housing 104 includes two tapered grooves to receive corresponding anti-rotational pins. The grooves of the housing 104 are tapered at the same angle as the taper of the anti-rotational pins 108 and 106 and extend the length of the housing 104. Anti-rotational pins 106 and 108 are disposed in a through-hole that extends in a radial direction through the ball screw. A spring 110 is disposed between the two anti-rotational pins 106 and 108 to bias the anti-rotational pins 106 and 108 in a radially outward direction so that the pins engage with the corresponding grooves in the housing 104. By engaging with the grooves, the anti-rotational pins 106 and 108 prevent the ball screw from rotating relative to the housing when the ball nut rotates, but permit the ball screw to translate axially in the housing. When the ball nut rotates and the ball screw is held stationary using the anti-rotational pins 106 and 108, the relative rotation between the ball nut and the ball screw causes translation of the ball screw in an axial direction relative to the housing. Because the tapered ends of each anti-rotational pin is biased toward the groove having corresponding tapered sides, a constant tight fit is ensured, thereby eliminating lash of the ball screw relative to the housing.

Figure 3:
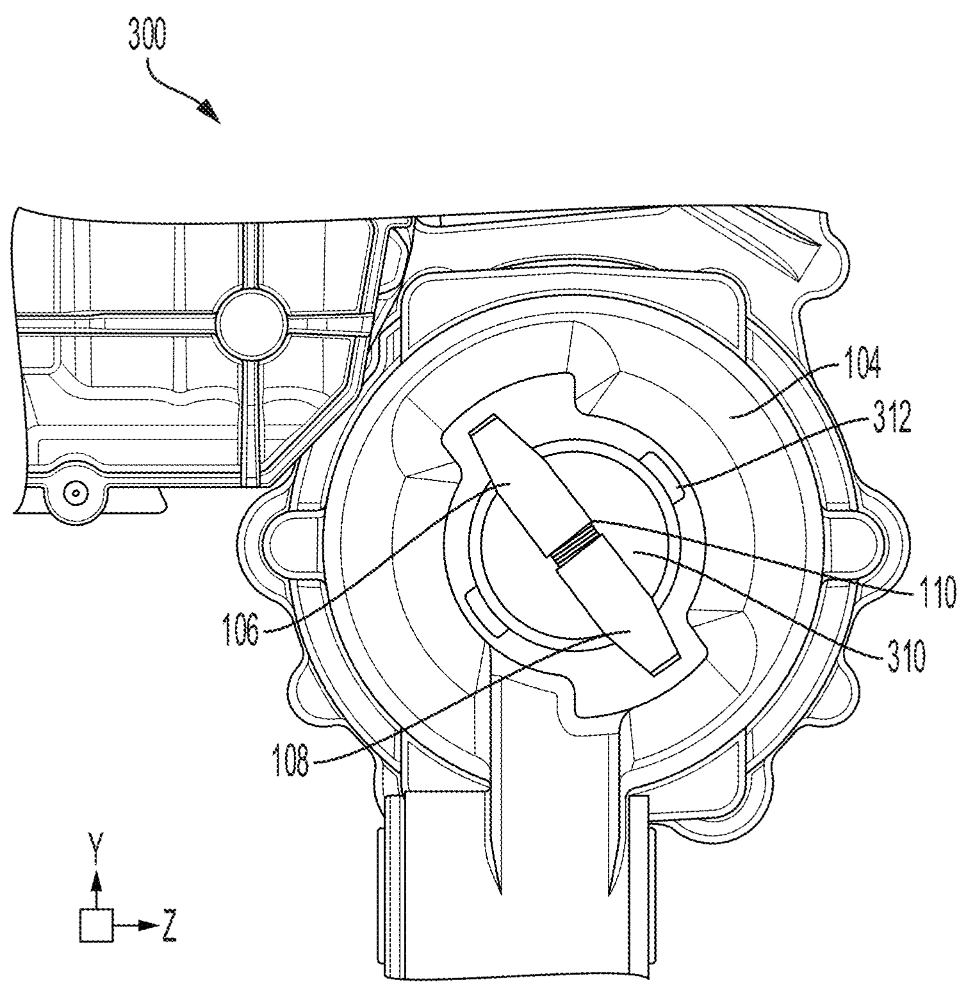
FIG. 3 illustrates a front cross-section view of a housing of the gear assembly of the vehicle, according to one or more examples of the present disclosure.

FIG. 3 illustrates a front cross-section view of a housing of the gear assembly of the vehicle, according to one or more examples of the present disclosure. As disclosed with respect to FIG. 2, the housing 104 includes a ball screw 310 and the ball nut 312. The housing 104 of the gear assembly includes two tapered grooves on opposite ends. The angle of taper of the grooves in the housing 104 of the gear assembly matches the angle of taper on the anti-rotational pins 106 and 108. Two anti-rotational pins 106 and 108 are placed in a through hole of the ball screw 310 and inserted in the two tapered grooves of the housing 104. A spring 110 is placed between the two anti-rotational pins 106 and 108 to provide a radial outward force to hold the anti-rotational pins 106 and 108 in constant contact with the housing 104 of the gear assembly. The forces applied on the anti-rotational pins 106 and 108, the ball screw 310, and the ball nut 312 are discussed in more detail in FIG. 4.

Figure 4:
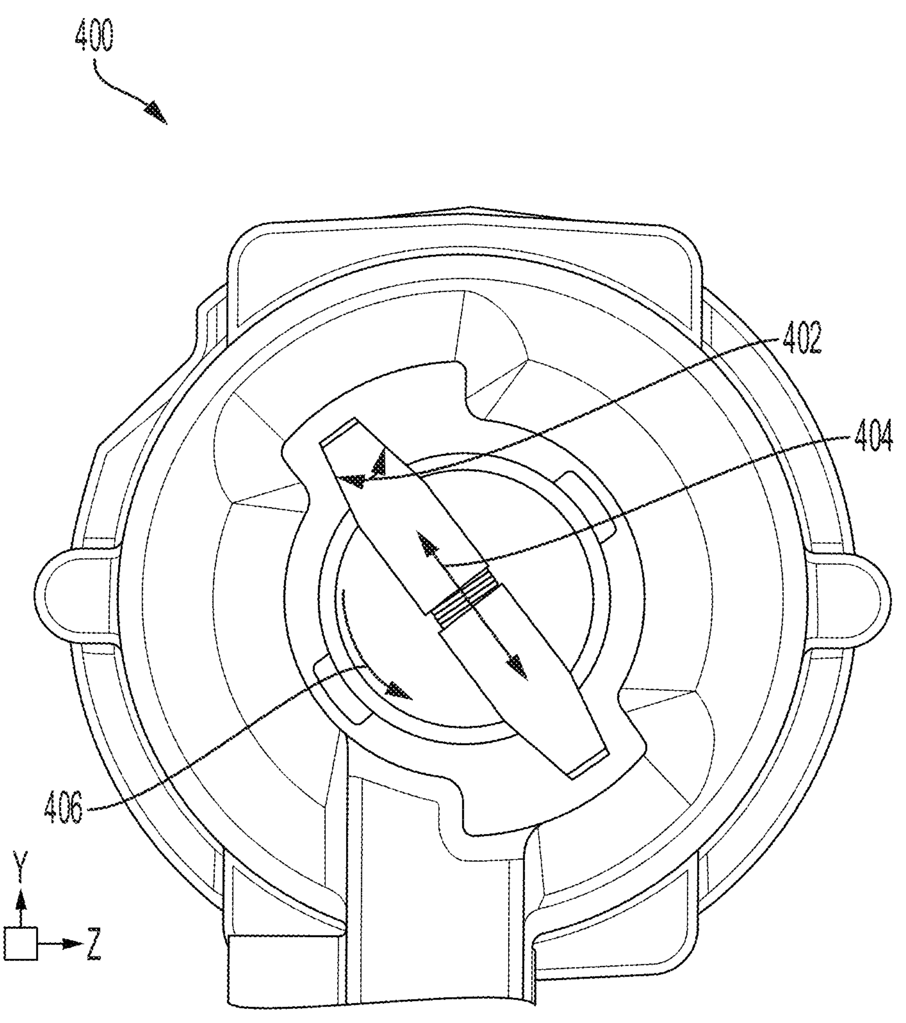
FIG. 4 illustrates another front cross-section view of the housing of the gear assembly of the vehicle, according to one or more examples of the present disclosure.

FIG. 4 illustrates another front cross-section view of a housing of the gear assembly of the vehicle, according to one or more examples of the present disclosure. FIG. 4 is similar to FIG. 3, except that FIG. 4 discusses the forces at play between the anti-rotational pins 106 and 108, the ball screw 310, the ball nut 312, and the housing 104 of the gear assembly, as shown in FIG. 3. Arrows 402 highlight the taper angle of the anti-rotational pins 106 and 108 and the corresponding grooves in the housing 104. The taper angle of the anti-rotational pins 106 and 108 is similar to the taper angle of the corresponding grooves in the housing 104. The spring 110 placed between the anti-rotational pins 106 and 108 provides a radial force highlighted by arrow 404 that ensures that the anti-rotational pins 106 and 108 are constantly in contact with the grooves created in the housing 104. Because the end of the groove is slightly narrower than the end of anti-rotational pins, spring ensures a constant tight fit between the tapered surfaces of each pin and the tapered walls of each groove. Arrow 406 depicts the rotational direction of the ball nut 312, which may be in either direction. As the ball nut 312 rotates relative to the ball screw, the threading of the ball nut and the ball screw causes, the ball screw to translate in an axial direction.

Figure 5:
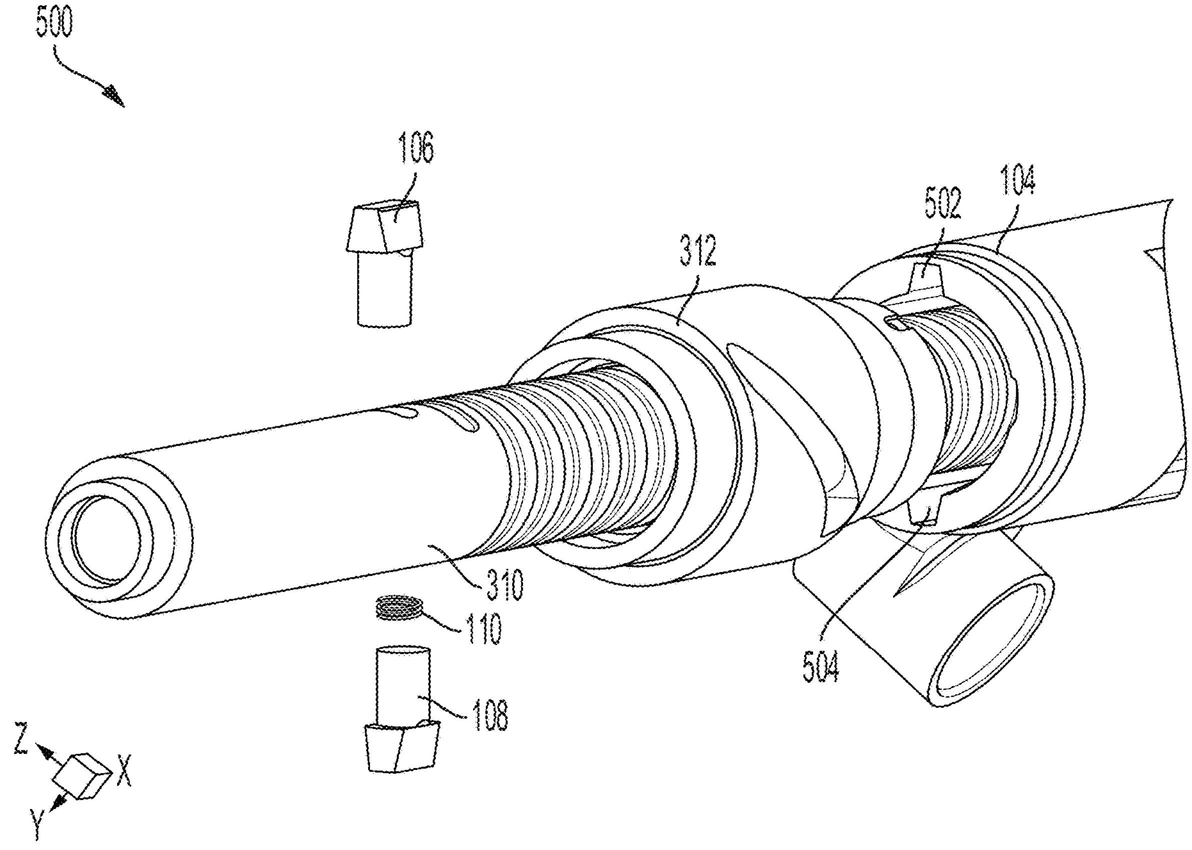
FIG. 5 illustrates a perspective view of a portion of the complete gear assembly of the vehicle, according to one or more examples of the present disclosure.

FIG. 5 illustrates a perspective view of a portion of the complete gear assembly of the vehicle, according to one or more examples of the present disclosure. Perspective view 500 depicts a housing 104 of the gear assembly. The housing 104 of the gear assembly is cylindrically shaped and extends in an axial direction. Ball screw 310 extends axially within the housing 104. Ball nut 312 is configured to rotate relative to the ball screw 310 and engage the threads of the ball screw 310. In some embodiments, the ball nut 312 may be housed in a portion of the housing 104 that permits rotation of the ball nut 312, while restricting translation of the ball nut 312. Anti-rotational pins 106 and 108 are placed in a through hole that extends radially through the ball screw 310. Spring 110 placed between the anti-rotational pins 106 and 108 provides an outward radial force that ensures that the anti-rotational pins 106 and 108 are in constant tight contact with the grooves 502 and 504 in an inner wall of the housing 104 that extend axially. Grooves 502 and 504 are created on opposite sides of the ball screw 310 corresponding to the open ends of the through-hole in the ball screw and have tapered side walls that taper at the same angle as the tapered surfaces of the anti-rotational pins 106 and 108. Grooves 502 and 504 extend axially along the length of the cylindrical portion of the housing 104. The anti-rotational pins 106 and 108 engaging with the grooves 502 and 504 of the housing 104 restrict any rotation of the ball screw 310 relative to the housing. Thus, because the rotation of the ball screw 310 is restricted, the circumferential rotation of the ball nut 312 results in translation of the ball screw in the axial direction.

In some embodiments, any number of anti-rotational pins may be used to avoid lash in the electric powered steering gears. The inner cylindrical wall of the housing may be modified to include the same number of grooves extending in the axial direction, as the number of anti-rotational pins used. In this embodiment, instead of a through hole, the ball screw has a hole for each anti-rotational pin and a respective spring to bias the anti-rotational pin in a radially outward direction towards a corresponding groove.

Figure 6:
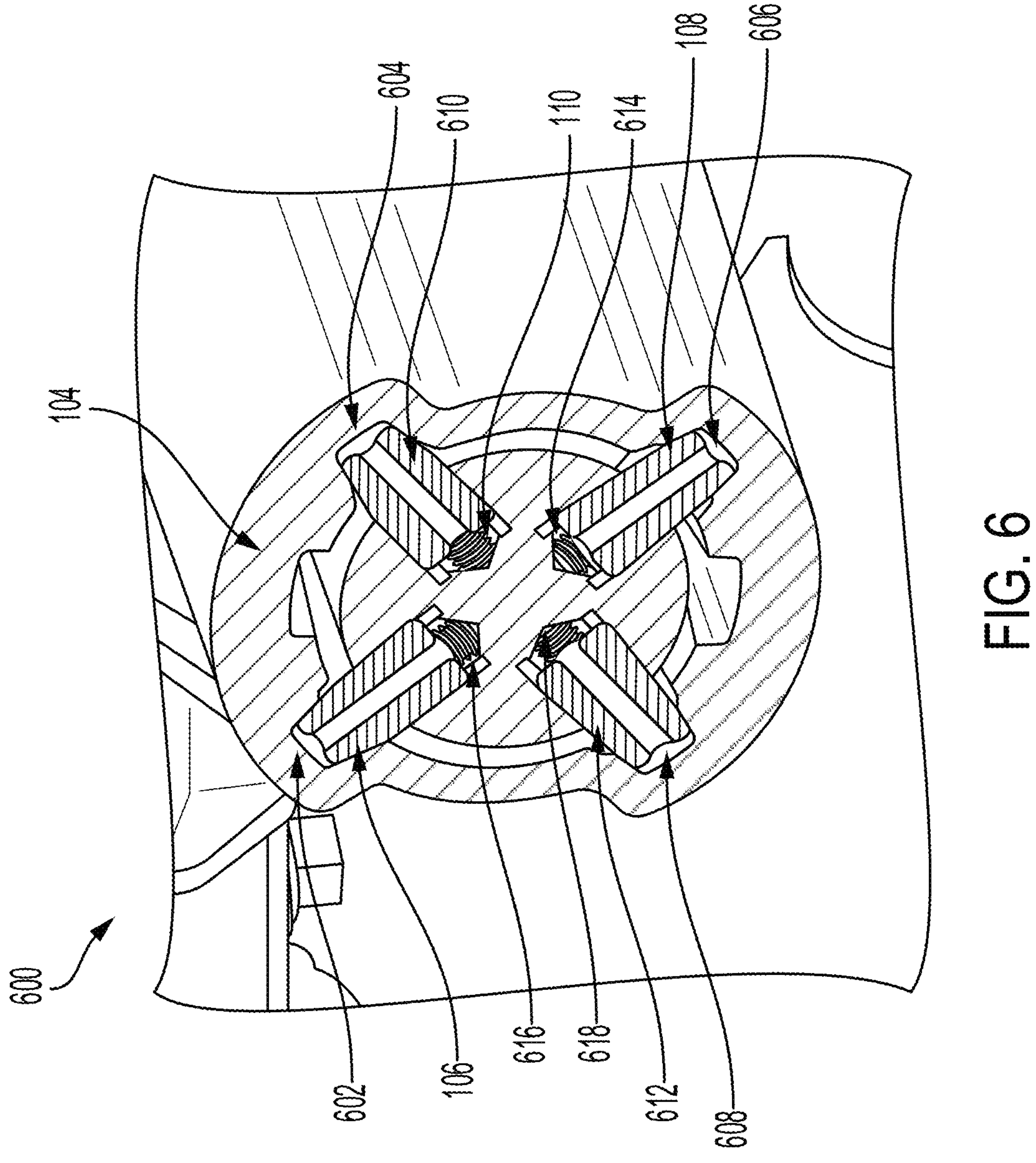
FIG. 6 illustrates a perspective view of a cross-section of a housing of the gear assembly of the vehicle, according to one or more examples of the present disclosure.

FIG. 6 illustrates another cross-section view of a housing of the gear assembly of the vehicle, according to one or more examples of the present disclosure. As disclosed with respect to FIG. 3, the housing 104 includes a ball screw 310 and the ball nut 312. The cross-section view 600 of FIG. 6 is similar to cross-section view 300 of FIG. 3 except the cross-section view 600 has four tapered grooves 602, 604, 606, and 608 distributed in the housing 104 instead of the two shown in FIG. 3. In some embodiments, the number of tapered grooves in the housing 104 may be selected based on the number of anti-rotational pins used to prevent lash in the electric power steering gears. Instead of a through hole, the ball screw may include four separate holes, where each hole of the ball screw 310 corresponds to a corresponding tapered groove 602, 604, 606, or 608 in the housing 104. Anti-rotational pins 106, 108, 610, and 612 are placed in the holes of the ball screw 310 and a spring is placed in each hole, at a first end of the anti-rotational pin, to bias the tapered ends of each anti-rotational pin in a radially outward direction to engage with the four tapered grooves 602, 604, 606, and 608 of the housing 104. For example, FIG. 6 shows springs 110, 614, 616, and 618 that are inserted at the end of anti-rotational pins 106, 108, 610 and 612 in the ball screw 310. As discussed previously the springs 110, 614, 616, 618 provide a radial outward force to hold the anti-rotational pins 106, 108, 610, and 612 in constant contact with the housing 104 of the gear assembly.

A durability and performance of the anti-rotational pins 106, 108, 610, and 612 may be extended by modifying the anti-rotational pin by applying a coating or affixing a bearing material on the tapered ends of the anti-rotational pins. The details of the coating applied on the anti-rotational pins and the bearing material affixed on the anti-rotational pins are discussed in more detail in FIGS. 7 and 8A-C respectively.

Figure 7:
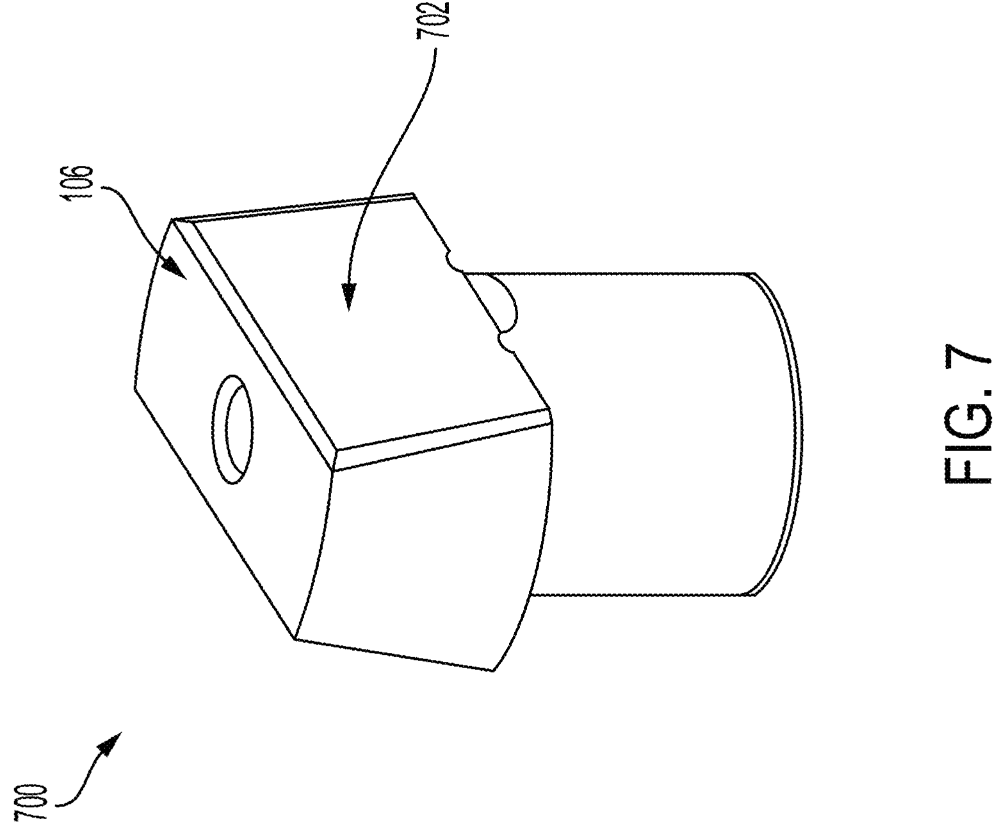
FIG. 7 illustrates a view of an anti-rotational pin, according to one or more examples of the present disclosure.

FIG. 7 illustrates a view of an anti-rotational pins according to one or more examples of the present disclosure. Illustration 700 shows a view of an anti-rotational pin 106 in which a low friction coating 702 is applied on the tapered ends of the anti-rotational pin 106 that comes in contact with the tapered grooves of the housing 104. In some embodiments, the low friction coating enhances the life of the anti-rotational pin 106 by reducing the friction between the tapered ends of the anti-rotational pin 106 and the tapered groove of the housing 104. For example, a coefficient of friction between the low friction coating 702 applied on the tapered ends of the anti-rotational pin 106 and the tapered walls of the groove of the housing 104 is less than a coefficient of friction between the tapered ends of the anti-rotational pin 106 and the tapered walls of the grooves of the housing 104. The low friction coating 702 applied on the tapered ends of the anti-rotational pin 702 may have a thickness in the range of 0.0001 inches to 0.0005 inches. In some other examples, the thickness of the coating may be approximately 50 microns. In some cases, the low friction coating 702 may comprise polytetrafluoroethylene (PTFE). Additionally and/or alternatively, the low friction coating may be Turcite (a combination of acetal and TFE), polyeretherketone (PEEK), ultra-high molecular weight polyethylene, non-ferrous based material like aluminized bronze, or polyphenylene sulphide (PPS). The low friction coating 702 may be applied to the anti-rotational pin 106 by spraying, electro-plating, hot dipping (galvanizing), vacuum deposition, and/or baking. In some embodiments, a low friction coating of the same material may also be applied on the tapered groove of the housing 104 to reduce friction between the tapered ends of the anti-rotational pin 106 and the tapered walls of the groove, and extend the life of the anti-rotational pin 106.

Figure 8B:
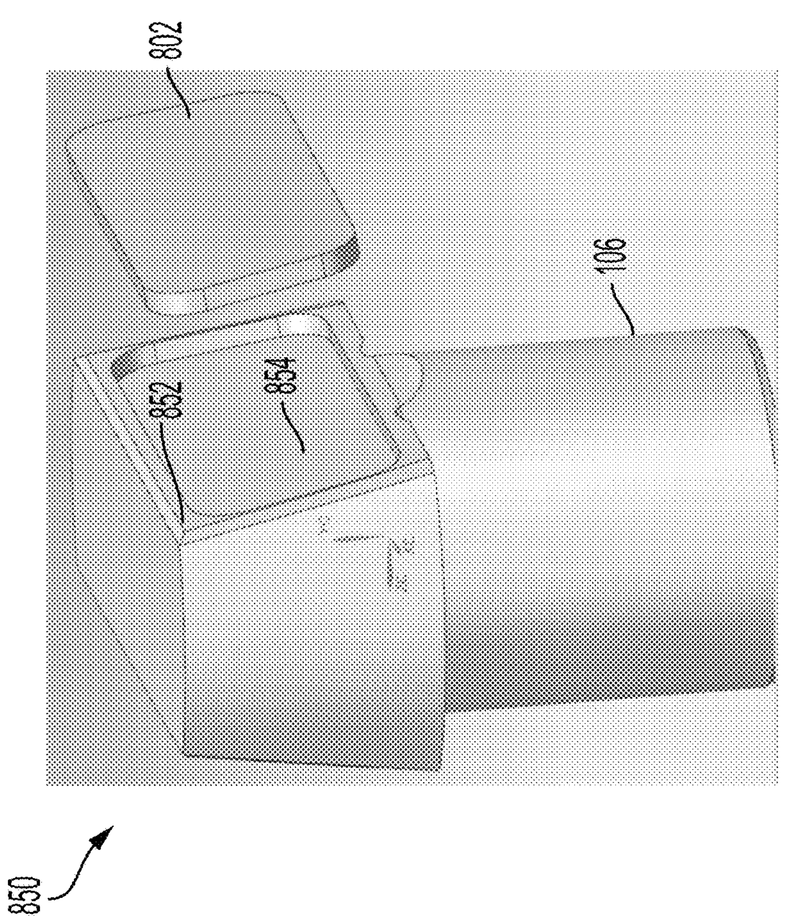
FIG. 8B illustrates another view of the anti-rotational pin, according to one or more examples of the present disclosure.
Figure 8A:
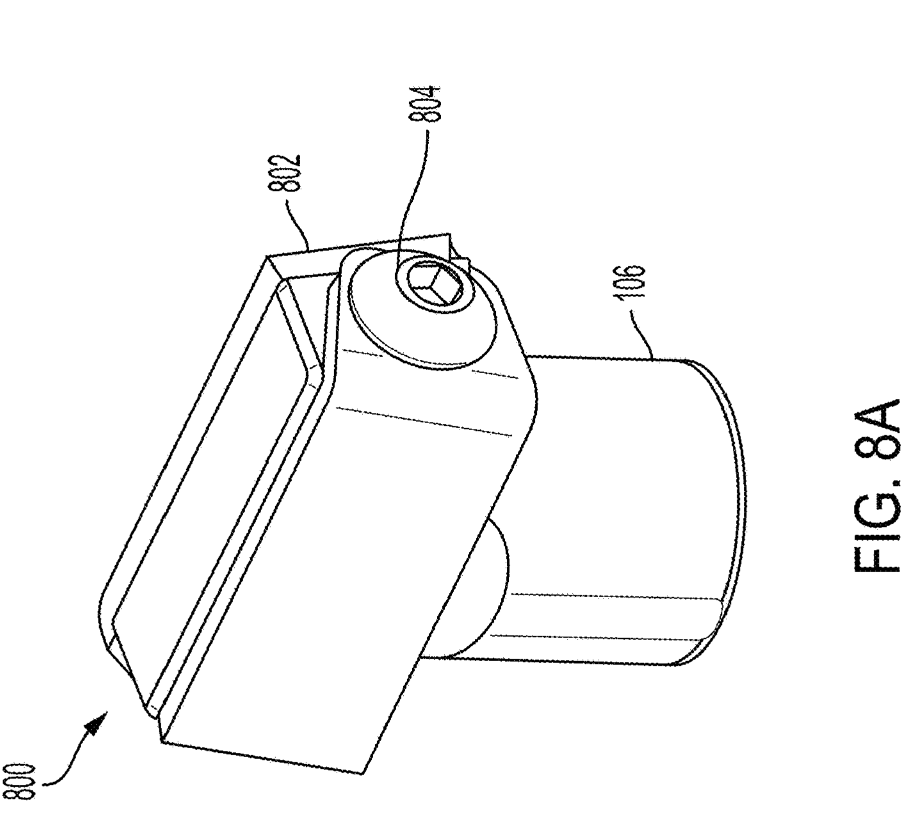
FIG. 8A illustrates another view of the anti-rotational pin, according to one or more examples of the present disclosure.

FIG. 8A illustrates another view of an anti-rotational pins according to one or more examples of the present disclosure. Illustration 800 shows a view of an anti-rotational pin 106 in which the tapered ends of the anti-rotational pin 106 are covered with a bearing material 802. In some embodiments, the bearing material enhances the life of the anti-rotational pin 106 by reducing the friction between the tapered ends of the anti-rotational pin 106 and the tapered groove of the housing 104. For example, a coefficient of friction between the bearing surface 802 applied on the tapered ends of the anti-rotational pin 106 and the tapered walls of the groove of the housing 104 is less than a coefficient of friction between the tapered ends of the anti-rotational pin 106 and the tapered walls of the grooves of the housing 104. In some embodiments, the coating 802 may be affixed to the anti-rotational pin 106 using a screw 804. As shown in FIG. 8A, the screw 804 may be attached to the anti-rotational pin 106 on a side of the anti-rotational pin 804 that is between the tapered ends and adjacent to a smaller side of the tapered ends. In some cases, a second screw (not shown) may be used on an opposite side to securely affix the bearing material to the tapered ends of the anti-rotational pin 106. In some embodiments, the bearing material may be affixed to the tapered ends of the anti-rotational pin 106 by means of an adhesive. In some embodiments, the bearing material may be held in a recessed "pocket" machined in faces of the tapered end of the anti-rotational pin. In such embodiments, the depth of the pocket is designed to "trap" the bearing material. In some embodiments, two "L-shaped" pieces of bearing material 802 may be affixed to cover each of the tapered surfaces of the tapered end of the anti-rotational pin 106.

Additionally and/or alternatively, bearing material may also be applied on the tapered groove of the housing 104 to reduce friction between the tapered ends of the anti-rotational pin 106 and the tapered walls of the groove, and extend the life of the anti-rotational pin 106. In some embodiments, the bearing material may be held in a recessed "pocket" machined in faces of the tapered grooves of the housing 104. The depth of the pocket is designed to "trap" the bearing material.

FIG. 8B illustrates another view of the anti-rotational pin, according to one or more examples of the present disclosure. The view 850 of anti-rotational pin 106 shown in FIG. 8B depicts an alternative way of affixing the bearing material on the surface of the tapered ends of the anti-rotational pin 106. As shown in view 850 of FIG. 8B, a recessed pocket may be created on the surface 852 of the tapered ends to reveal a second tapered surface 854. The bearing material 802 is configured to abut the second tapered surface 854 and fit in the recessed pocket of the tapered surface 852 of the anti-rotational pin 106. In order for the bearing material 802 to be securely held in the anti-rotational pin 106, the bearing material 802 may have dimensions same as the dimensions of the recessed pocket. The bearing material 802 may also have a thickness that is same as the thickness of the recessed pocket. In some embodiments, the bearing material 802 is held in place by being trapped between the recessed pocket and the corresponding tapered groove in the housing 104.

Figure 8C:
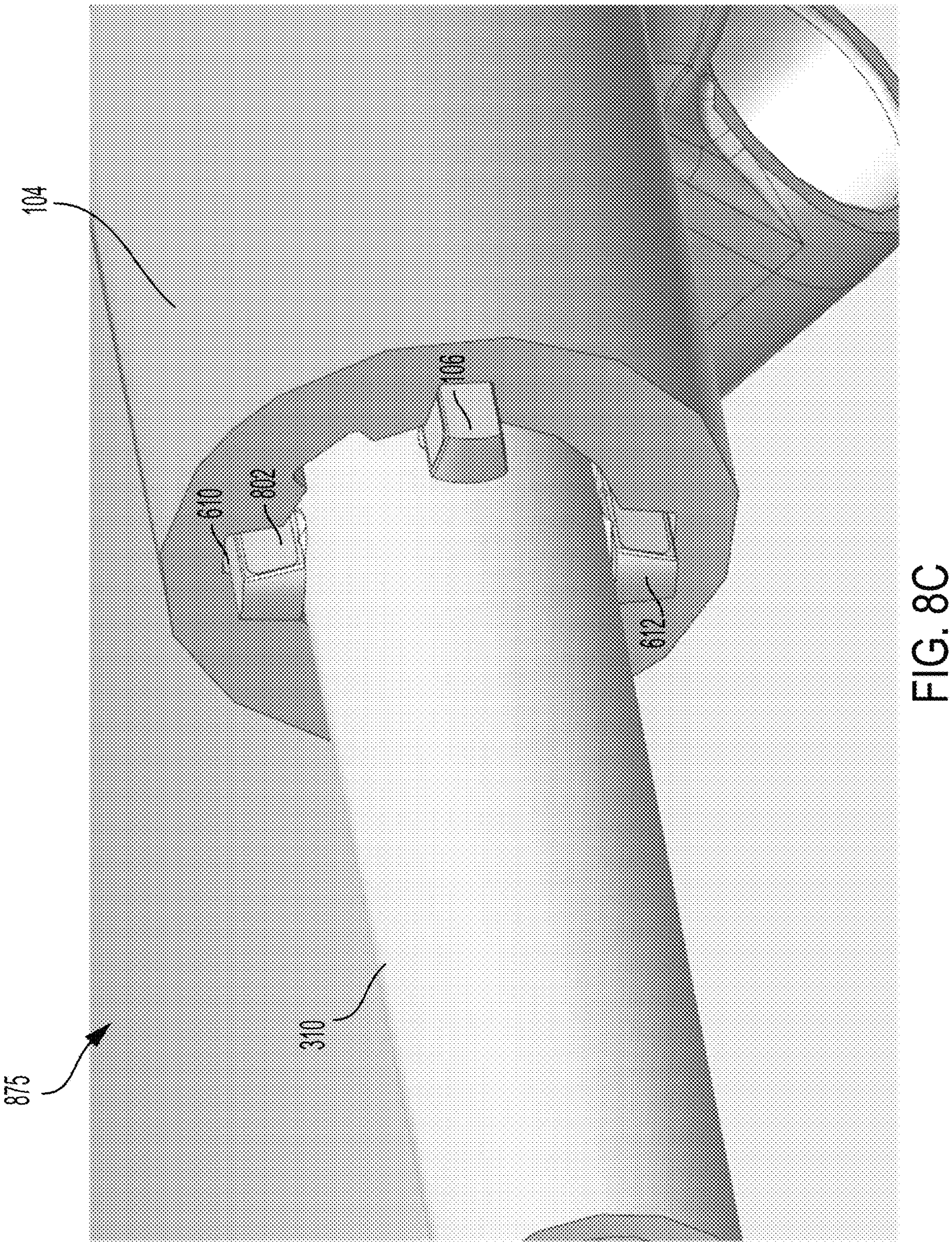
FIG. 8C illustrates a perspective view of a portion of the complete gear assembly of the vehicle, according to one or more examples of the present disclosure.

FIG. 8C illustrates a perspective view of a portion of the complete gear assembly of the vehicle, according to one or more examples of the present disclosure. Perspective view 875 depicts the housing 104 of the gear assembly that is cylindrically shaped and extends in an axial direction. Ball screw 310 extends axially within the housing 104. Anti-rotational pins 106, 610, and 612 are placed in holes in the ball screw 310. Springs 110, 616, and 618 (not shown) placed between the anti-rotational pins 106, 610, and 612 and the holes that provides an outward radial force that ensures that the anti-rotational pins 106, 610, and 612 are in constant tight contact with the respective grooves in an inner wall of the housing 104 that extend axially. As shown in the perspective view 875, a bearing material 802 is affixed on the tapered surface of the anti-rotational pins 106, 610, and 612.

The bearing material may be a steel backed sheet with bronze and polymer fillers. In some embodiments, the bearing material may be provided as a sheet of steel with bronze layers. The bronze layers may have holes in them, which are filled with filler material such as graphite, or PTFE. These layers are then rolled up into a bushing and used as the material to create a bearing surface. Additionally and/or alternatively, the bearing material 802 may comprise polytetrafluoroethylene (PTFE) or other suitable materials.

In some embodiments, a support bushing may be used to support and stabilize the ball screw. The support bushing is an approvement that may absorb external radial loads applied on the ball screw and in doing so, reduce the radial movement of the ball screw and the anti-rotational pins which reduces the stress on the anti-rotational pins.

Figures 9, 10:
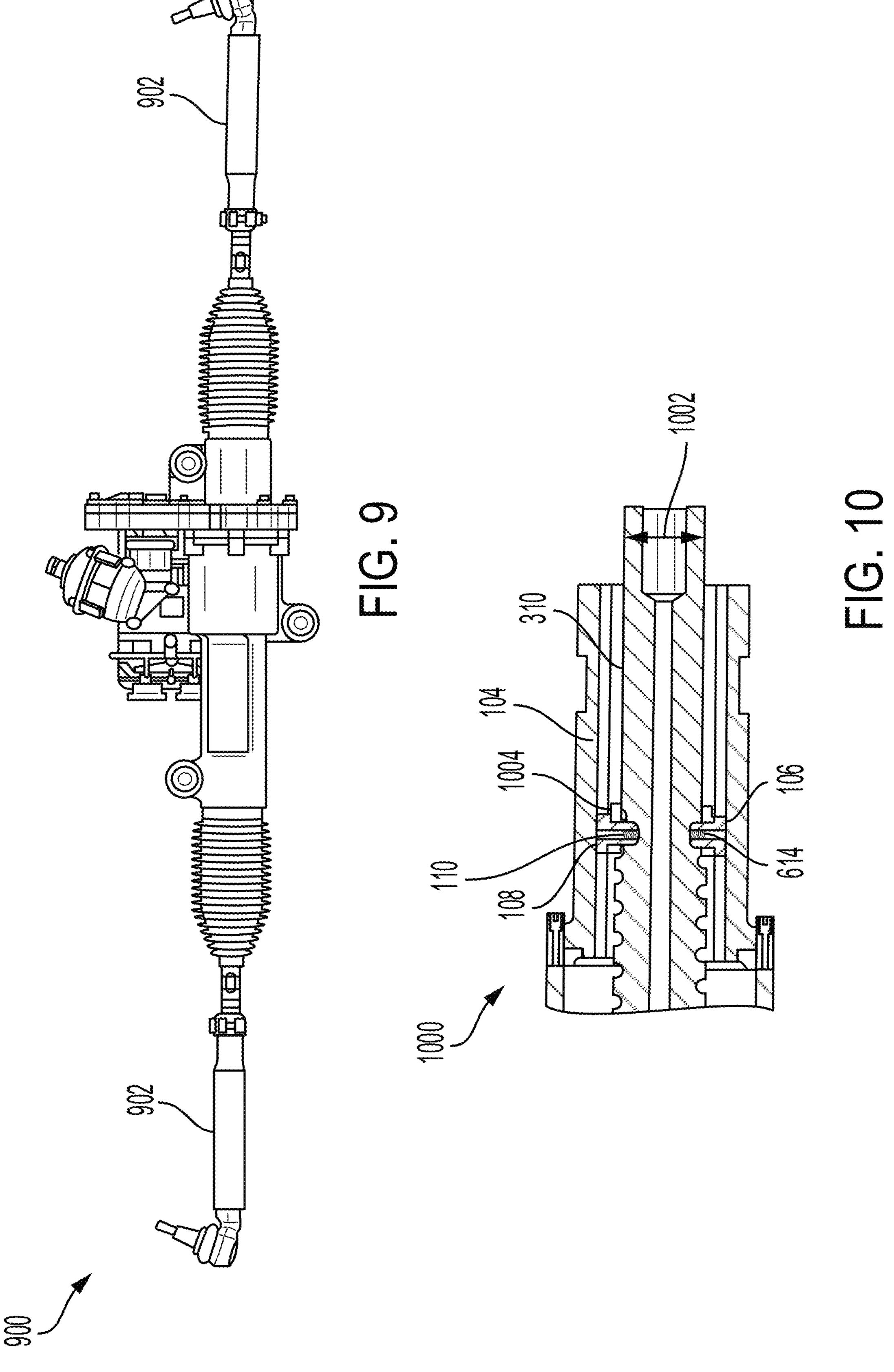
FIG. 9 illustrates another overview of the gear assembly of a vehicle, according to one or more examples of the present disclosure.
FIG. 10 illustrates another side cross-section view of a portion of the complete gear assembly of the vehicle, according to one or more examples of the present disclosure.

FIG. 9 illustrates another overview of a gear assembly of a vehicle, according to one or more examples of the present disclosure. The gear assembly 900 of FIG. 9 is similar to the gear assembly 100 shown in FIG. 1. As discussed with respect to FIG. 1, the gear assembly 900 depicted in FIG. 1 is responsible for providing the steering functionality to the vehicle. When a steering command is received at the gear assembly 900, the steering command is transmitted via tie rods 902 of the gear assembly 900 to the wheels connected to the gear assembly 900. In some embodiments, the steering of the wheels of the vehicle exerts an external load on the ball-screw 310 via the tie rods 902. For example, the movement of the wheels in response to the steering command induces an arc-like motion in the tie rods 902. The arc-like motion of the tie-rods 902 may change an angle of connection between the tie-rods 902 and a ball joint that connects the tie-rods to the ball screw 310. The change in the angle of connection of the ball joint may exert a load on the ball screw 310. Additionally, a suspension of the vehicle, also attached to the wheels of the vehicle may exert an external load on the ball screw 310. The external loads, stemming from the tie-rods 902 or the suspension of the vehicle, may manifest as radial loads on the ball screw 310. This is discussed in more detail in FIGS. 10-12.

FIG. 10 illustrates another side cross-section view of a portion of the complete gear assembly of the vehicle, according to one or more examples of the present disclosure. Portion 1000 of the gear assembly 900 includes a housing 104 of the gear assembly that is cylindrically shaped and extends transversely to the vehicle. A ball screw and ball nut (shown in more detail in FIGS. 3 and 5) are present in the housing 104. The ball nut and the ball screw are configured to convey the steering commands received from a driver to the wheels of the vehicle to steer the vehicle. In order to hold the ball screw grounded to the housing 104, the housing 104 includes tapered grooves to receive corresponding anti-rotational pins 108 and 106. The grooves of the housing 104 are tapered at the same angle as the taper of the anti-rotational pins 108 and 106 and extend the length of the housing 104. Anti-rotational pins 106 and 108 are disposed in independent holes that extend in a radial direction. Spring 614 and 110 is disposed between the anti-rotational pin 106 and 108 and the surface of the corresponding hole to bias the anti-rotational pin 106 and 108 in a radially outward direction so that the pins engage with the corresponding grooves in the housing 104. By engaging with the grooves, the anti-rotational pins 106 and 108 prevent the ball screw from rotating relative to the housing when the ball nut rotates, but permit the ball screw to translate axially in the housing. When the ball nut rotates and the ball screw is held stationary using the anti-rotational pins 106 and 108, the relative rotation between the ball nut and the ball screw causes translation of the ball screw in an axial direction relative to the housing. Because the tapered ends of each anti-rotational pin are biased toward the groove having corresponding tapered sides, a constant tight fit is ensured, thereby eliminating lash of the ball screw relative to the housing. In some embodiments, a radial load is exerted on the ball screw 310 based on the arc-like motion of the tie-rods 902 that causes changes an angle of connection between the tie-rods 902 and a ball joint that connects the tie-rods to the ball screw 310. Additionally, radial loads may be exerted on the ball screw 310 by the suspension of the vehicle that is connected to the gear assembly (not shown).

In the absence of a support bushing, the external loads that are exerted on the ball screw may be exerted on the anti-rotational pin 106 and 108. The external loads exerted on the ball screw may cause radial motion of the ball screw, which in turn causes radial movement of the anti-rotational pins 106 and 108 which may increase wear and tear of the anti-rotational pins 106 and 108 and thereby reduce the efficiency of the anti-rotational pins 106 and 108 in preventing lash during steering.

A support bushing 1004 that is installed around the anti-rotational pins may absorb the radial loads applied on the ball screw 310. By absorbing the radial loads, the support bushing 1004 reduces the radial movement of the ball screw 310 and stabilizes the ball screw. By stabilizing the ball screw, the support bushing 1004 is able to reduce the radial movements of the anti-rotational pins 106 and 108. Once the radial movement of the anti-rotational pins 106 and 108 is reduced, the anti-rotational pins 106 and 108 may only be responsive to the torque exerted on the ball screw 310 in response to the steering command received from the electric powered steering gears, thereby working efficiently to hold the ball screw 310 with respect to the ball nut 312.

Figures 11A, 11B:
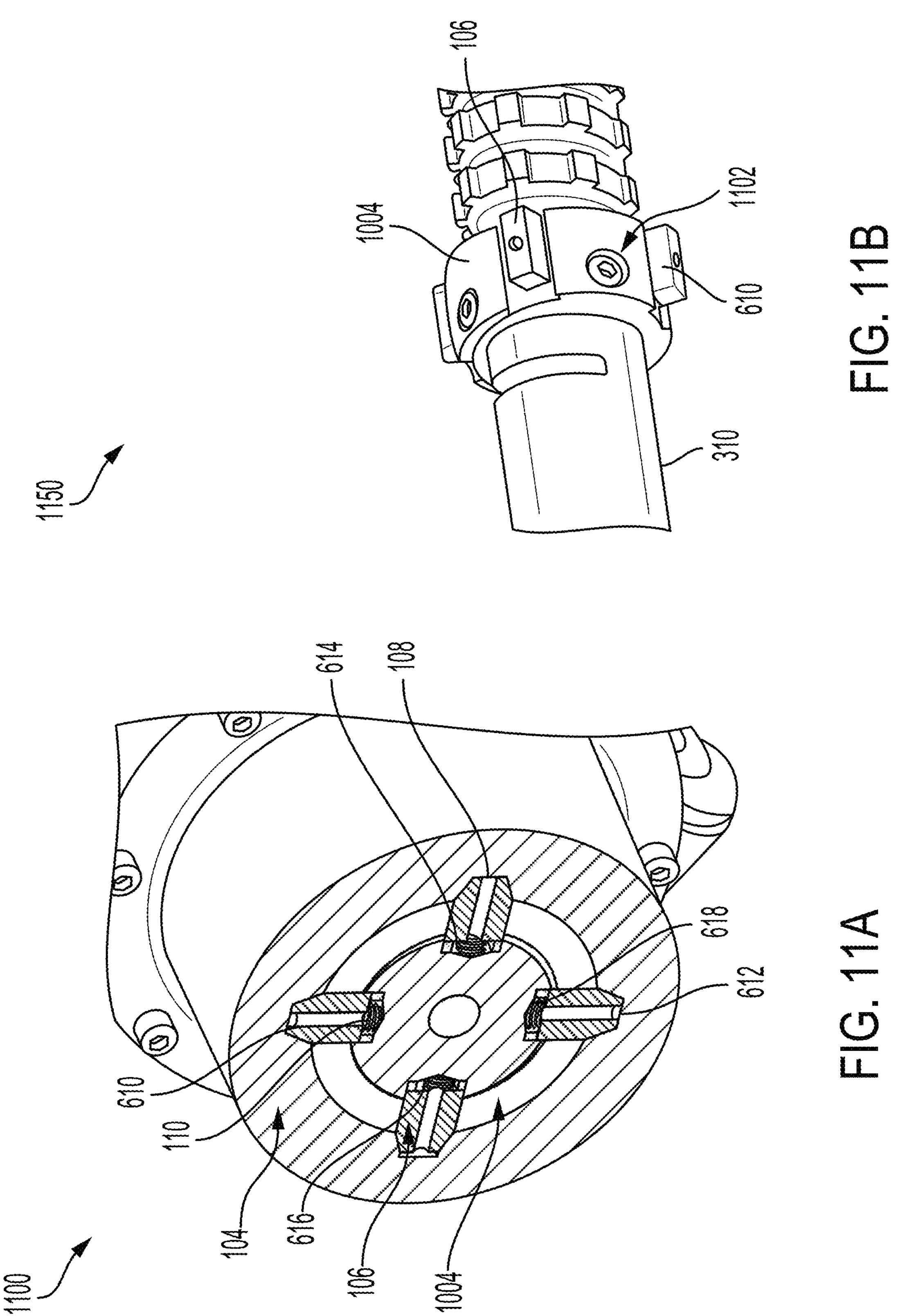
FIG. 11A illustrates another cross-section view of the housing of the gear assembly of the vehicle, according to one or more examples of the present disclosure.
FIG. 11B illustrates a partial cross-section view of the housing of the gear assembly of the vehicle, according to one or more examples of the present disclosure.

FIG. 11A illustrates another cross-section view of the housing of the gear assembly of the vehicle, according to one or more examples of the present disclosure. View 1100 of FIG. 11A shows the position of the support bushing 1004 in the housing 104 of the gear assembly 900 (shown in FIG.

9). View 1100 depicts a housing 104 which houses the ball nut 312 (not shown in FIG. 11A), the ball screw 312 (not shown in FIG. 11A), anti-rotational pins 106, 108, 610, and 612 placed in tapered grooves of the housing 104, and springs 110, 614, 616, and 618 (616 and 618 are not shown in FIG. 11A) corresponding each of the anti-rotational pins 108, 106, 610, and 612 (610 and 612 not shown in FIG. 11A) respectively. The support bushing 1004 is disposed between the housing 104 and the ball screw 310. In some embodiments, the support bushing 1004 may include holes corresponding to the tapered grooves of the housing 104 and holes in the ball screw 310. As shown in view 1100 of FIG. 11A, the holes of the support bushing 1004 receive the anti-rotational pins 106, 108, 610, and 612.

FIG. 11B illustrates a partial cross-section view of the housing of the gear assembly of the vehicle, according to one or more examples of the present disclosure. View 1150 of FIG. 11B provides a three-dimensional (3D) view of the support bushing 1004 without the housing 104. From view 1150, it is observed that the support bushing 1004 is affixed to the ball screw 310 using a number of bolts 1102. View 1150 of FIG. 11B also shows the tapered ends of anti-rotational pins 106 and 610 that are put through the holes of the support bushing 1004 into the ball screw 310. The tapered ends of the anti-rotational pins 106 and 610 are biased against the tapered walls of the respective grooves of the housing 104 (not shown in view 1150).

Figure 12:
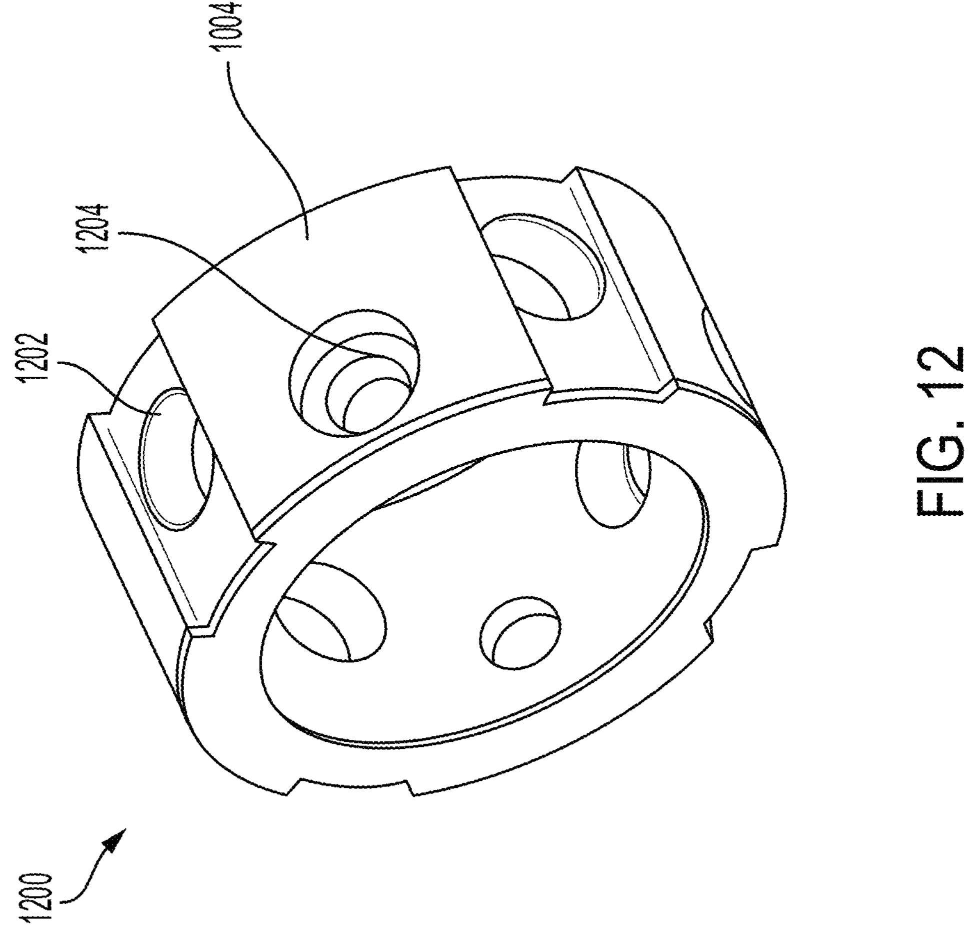
FIG. 12 illustrates a support bushing associated with the gear assembly of the vehicle, according to one or more examples of the present disclosure.

FIG. 12 illustrates a support bushing associated with the gear assembly of the vehicle, according to one or more examples of the present disclosure. Support bushing 1004 shown in FIG. 12 is circular in shape and is designed to surround the ball screw 310. The support bushing 1004 may include differently-shaped holes 1202 and 1204. The holes 1202 of the support bushing 1004 are configured to receive the anti-rotational pins. In some embodiments, the number of holes 1202 provided in the support bushing 1004 may be dependent on a number of anti-rotational pins installed on the ball screw 310. In some embodiments, the holes 1202 have a sliding contact to accommodate the tapered ends of the anti-rotational pins 106, 610, 612, and 614 (not shown in FIG. 12). The holes 1204 of the support bushing 1004 are configured to receive bolts 1102 that attach the support bushing 1004 to the ball screw 310. As with respect to the number of holes 1202, the number of holes 1204 may be provided in the support bushing 1004 may be dependent on a number of bolts 1102 that are used to fasten the support bushing 1004 to the ball screw 310. Additionally and/or alternatively, the support bushing 1004 may be affixed to the ball screw 310 using pins, retaining rings or machined shoulder, or other mechanisms.

The support bushing 1004 may be composed of a smooth steel, a bearing metal (e.g., bronze), or a bearing material as described with respect to FIG. 8A. In some embodiments, a coating may be applied on the support bushing 1004. The coating may be applied as discussed in detail with respect to FIG. 7. The application of the coating may enhance the durability of the support bushing by reducing a coefficient of friction between the support bushing 1004 and the ball screw 310.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electric powered steering assembly for a commercial vehicle, comprising:
- a housing including a cylindrical portion extending in an axial direction, an interior wall of the cylindrical portion defining a groove and extending in the axial direction, the groove having at least two inwardly tapered walls;
- a ball screw disposed in the housing, extending in the axial direction, and defining a hole extending in a radial direction;
- a ball nut disposed in the housing surrounding the ball screw and configured to rotate relative to the housing;
- an anti-rotational pin having a tapered end disposed in the hole, the tapered end having at least two tapered surfaces, each corresponding to a respective one of the at least two inwardly tapered walls;
- a spring disposed in the hole and configured to bias the anti-rotational pin in a radially outward direction towards the groove so that the at least one tapered end of the anti-rotational pin engages the groove and thereby restricts rotation of the ball screw relative to the housing; and
- a support bushing disposed in the housing between the ball screw and the housing, the support bushing being fixedly coupled to the ball screw and defining a through hole disposed between the groove and the hole of the ball screw,
- the through hole configured to receive the anti-rotational pin,
- wherein the support bushing absorbs radial loads exerted on the ball screw by the electric power steering assembly and supports the anti-rotational pin.

2. The electric powered steering assembly of claim 1, further comprising:
- the interior wall of the cylindrical portion defining a second groove and extending in the axial direction, the second groove having at least two inwardly tapered walls;
- the ball screw disposed in the housing, extending in the axial direction, and defining a second hole extending in the radial direction;
- a second anti-rotational pin having a tapered end disposed in the second hole, the tapered end having at least two tapered surfaces, each corresponding to a respective one of the at least two inwardly tapered walls of the second groove; and a second spring disposed in the second hole and configured to bias the second anti-rotational pin in a radially outward direction towards the second groove so that the at least one tapered end of the second anti-rotational pin engages the second groove and thereby restricts rotation of the ball screw relative to the housing.

3. The electric powered steering gear of claim 1, wherein the at least two tapered walls of the groove inwardly taper at a first angle.

4. The electric powered steering gear of claim 3, wherein the at least two tapered surfaces of the tapered end of the anti-rotational pin taper at the first angle to match the taper of the groove.

5. The electric powered steering gear of claim 1, wherein the ball nut is configured to rotate over the ball screw and engage threads of the ball screw.

6. The electric powered steering gear of claim 5, wherein the rotation of the ball nut over the ball screw results in an axial translation of the ball screw in a right or left direction based on a rotational direction of the ball nut.

7. The electric powered steering gear of claim 1, wherein engaging the groove with the anti-rotational pin restricts the rotation of the ball screw relative to the ball nut.

8. The electric powered steering gear of claim 1, wherein the support bushing is fixedly coupled to the ball screw using a plurality of bolts distributed evenly across the support bushing.

9. The electric powered steering gear of claim 1, wherein the support bushing is composed of a smooth steel or bronze.

10. The electric powered steering gear of claim 1, further comprising applying a coating on the support bushing.

11. The electric powered steering gear of claim 1, wherein the coating is composed of polytetrafluoroethylene (PTFE).

12. A method of providing a lash-free electric powered steering gear for a commercial vehicle, the method comprising:

providing a housing including a cylindrical portion extending in an axial direction, an interior wall of the cylindrical portion defining a groove and extending in the axial direction, the groove having at least two inwardly tapered walls;

providing a ball screw disposed in the housing, extending in the axial direction, and defining a hole extending in a radial direction;

providing a ball nut disposed in the housing surrounding the ball screw and configured to rotate relative to the housing;

providing an anti-rotational pin having a tapered end disposed in the hole, the tapered end having at least two tapered surfaces, each corresponding to a respective one of the at least two inwardly tapered walls;

biasing the anti-rotational pin, using a spring disposed in the hole, in a radially outward direction towards the groove so that the at least one tapered end of the anti-rotational pin engages the groove and thereby restricts rotation of the ball screw relative to the housing;

providing a support bushing disposed in the housing between the ball screw and the housing, the support bushing being fixedly coupled to the ball screw and defining a through hole disposed between the groove and the hole of the ball screw, wherein the through hole is configured to receive the anti-rotational pin; and absorbing, using the support bushing, radial loads exerted on the ball screw by the electric power steering assembly and supporting the anti-rotational pin.

13. The method of claim 12, further comprising:

providing the interior wall of the cylindrical portion defining a second groove and extending in the axial direction, the second groove having at least two inwardly tapered walls;

providing the ball screw disposed in the housing, extending in the axial direction, and defining a second hole extending in the radial direction;

providing a second anti-rotational pin having a tapered end disposed in the second hole, the tapered end having at least two tapered surfaces, each corresponding to a respective one of the at least two inwardly tapered walls of the second groove; and providing a second spring disposed in the second hole and configured to bias the second anti-rotational pin in a radially outward direction towards the second groove so that the at least one tapered end of the second anti-rotational pin engages the second groove and thereby restricts rotation of the ball screw relative to the housing.

14. The method of claim 12, wherein the at least two tapered walls of the groove inwardly taper at a first angle, and wherein the at least two tapered surfaces of the tapered end of the anti-rotational pin taper at the first angle to match the taper of the groove.

15. The method of claim 12, wherein the ball nut is configured to rotate over the ball screw and engage threads of the ball screw.

16. The method of claim 15, wherein the rotation of the ball nut over the ball screw results in an axial translation of the ball screw in a right or left direction based on a rotational direction of the ball nut.

17. The method of claim 1, wherein engaging the groove with the anti-rotational pin restricts the rotation of the ball screw relative to the ball nut.

18. The method of claim 1, wherein the support bushing is fixedly coupled to the ball screw using a plurality of bolts distributed evenly across the support bushing.

19. The method of claim 1, wherein the support bushing is composed of a smooth steel or bronze.

20. The method of claim 1, further comprising applying a coating on the support bushing, and wherein the coating is composed of polytetrafluoroethylene (PTFE).

* * * * *